(12) United States Patent
Martin et al.

(10) Patent No.: US 11,635,598 B2
(45) Date of Patent: Apr. 25, 2023

(54) TELEPHOTO LENS

(71) Applicant: Leica Camera AG, Wetzlar (DE)

(72) Inventors: Alexander Martin, Giessen (DE);
Michael Hartmann, Braunfels (DE);
Sigrun Kammans, Herborn (DE)

(73) Assignee: Leica Camera AG, Wetzlar (DE)

( * ) Notice: Subject to any disclaimer, the term of this patent is extended or adjusted under 35 U.S.C. 154(b) by 266 days.

(21) Appl. No.: 16/832,771

(22) Filed: Mar. 27, 2020

(65) Prior Publication Data
US 2020/0310084 A1  Oct. 1, 2020

(30) Foreign Application Priority Data

Mar. 29, 2019 (DE) .................. 10 2019 108 173.4

(51) Int. Cl.
*G02B 13/02* (2006.01)
*G02B 9/34* (2006.01)
(52) U.S. Cl.
CPC ............... *G02B 13/02* (2013.01); *G02B 9/34* (2013.01)
(58) Field of Classification Search
CPC ............. G02B 13/02; G02B 9/34; G02B 9/64
See application file for complete search history.

(56) References Cited

U.S. PATENT DOCUMENTS

| 4,534,626 A | * | 8/1985 | Mihara | G02B 13/02 |
| | | | | 359/745 |
| 5,388,006 A | * | 2/1995 | Koelsch | G02B 15/04 |
| | | | | 359/748 |
| 5,627,685 A | * | 5/1997 | Yamanashi | G02B 13/02 |
| | | | | 359/747 |
| 5,757,555 A | | 5/1998 | Sato | |
| 2006/0056066 A1 | * | 3/2006 | Fujisaki | G02B 13/02 |
| | | | | 359/745 |

OTHER PUBLICATIONS

German-language Search Report issued in German Application No. 102019108173.4 dated Dec. 10, 2019 with partial English translation (12 pages).

* cited by examiner

*Primary Examiner* — Alicia M Harrington
(74) *Attorney, Agent, or Firm* — Crowell & Moring LLP

(57) ABSTRACT

A telephoto lens having an entrance pupil of between 80 and 110 mm includes a lens head and a focusing component. The lens head, as a first optical assembly, consists of four lens elements with a refractive power sequence that alternates in the light direction. The focusing component is a second optical assembly made of at least two lens elements and has a relative aperture of between 1:4.5 and 1:7.

20 Claims, 2 Drawing Sheets

TELEPHOTO LENS

CROSS REFERENCE TO RELATED APPLICATION

This application claims priority under 35 U.S.C. § 119 from German Patent Application No. 10 2019 108 173.4, filed Mar. 29, 2019, the entire disclosure of which is herein expressly incorporated by reference.

BACKGROUND

The invention relates to a telephoto lens, in particular a telephoto lens with image erection, which has an entrance pupil of between 80 and 110 mm.

Telephoto lenses of the type set forth at the outset usually consist of a first optical assembly, which is also referred to as lens head, and a second optical assembly, denoted as a focusing component in accordance with its function. Here, the second optical assembly is displaced along an optical axis in order to image the object image captured by the lens head in focus, i.e., sharply, and with magnification into an image plane disposed at the end of an optical imaging chain.

SUMMARY

So as to avoid imaging aberrations, the focusing component must be guided with high accuracy and without tilting effects or axial run-out along the optical axis, which extends from the optical axis of the lens head to the image plane. For this reason, kit systems with interchangeable optical components, for example, are difficult to realize and can only be realized with great material outlay in respect of holding and guiding the optical lens elements employed. Arising image aberrations have to be avoided by way of an increased number of lens elements in the lens head and expensive special glasses. Much mechanical installation space is usually required so as not to have to keep tight manufacturing tolerances. Such systems are challenging from a mechanical and optical point of view and, if they can be realized at all, they can only be realized at high costs.

It was therefore an object of the invention to realize a compact and cost-effective optical system for use in telephoto lenses with an entrance pupil of between 80 mm and 110 mm, which optical system is insensitive to mechanical tolerances between the lens head and the focusing component.

In the case of a telephoto lens of the type set forth at the outset, as per the preamble of claim 1, this object is achieved according to the invention by the features of claim 1. Advantageous configurations arise from the features of the dependent claims.

In relation to the solution features specified in the claims, it should be noted that automated correction programs, such as, e.g., "Code V" by Optical Research Associates, are usually used in modern optics designs, said automated correction programs being able to calculate proposals for viable lens systems with a correction state that has been optimized for a certain task from specified lens element sequences and refractive power distributions. The automatically obtained correction state is improved further in each case on the basis of targeted modifications of the specified parameters by the optics designer.

In this way and with the aid of the figures that are depicted true to scale in the drawings, the construction data for radii, lens element thicknesses, lens element spacings, refractive indices and Abbe numbers of the optical glasses to be employed can already be obtained from the features of claim 1. The construction parameters can be incrementally improved in a targeted manner when the features specified in the dependent claims are taken into account.

A telephoto lens according to the invention has an entrance pupil of between 80 and 110 mm and consists of a lens head and a focusing component, wherein the lens head is embodied as a first optical assembly and advantageously consists of four lens elements with a refractive power sequence that alternates in the light direction and the focusing component is embodied as a second optical assembly and consists of at least two lens elements. In view of a small number of optical components, the configuration of the focusing component with exactly two lens elements is advantageous. The relative aperture of the lens is between 1:4.5 and 1:7. A particularly compact and tense embodiment has a relative aperture of 1:5.5. A compact lens with a small number of optical components is realized by way of these features.

In an advantageous configuration, two optically transparent plane plates which are perpendicular to the optical axis are introduced into the imaging ray path between the lens head and the focusing component for mechanical separability, while at the same time protecting the interior of the two optical assemblies from ambient influences (dust, moisture). By keeping one of the optical assemblies and replacing the other optical assembly, a kit system with different optical characteristics is realizable in this way in an advantageous and cost-effective manner.

Two interchangeable lens heads are provided in a further embodiment of a telephoto lens according to the invention. The tolerances required for good optical imaging performance become even tighter with a reduction in the focal length. Therefore, the focal length of the one lens head is between 290 mm and 320 mm, with a focal length of 300 mm being found to be particularly advantageous. The entrance pupil of this lens is 90 mm.

An alternative embodiment of a telephoto lens consists of a lens head, the focal length of which is between 340 mm and 380 mm, wherein the entrance pupil is 105 mm. A focal length of 350 mm was found to be particularly advantageous in this embodiment of a lens head.

Both the lens head with the 90 mm entrance pupil and the lens head with the 105 mm entrance pupil are characterized in that the four lens elements have a refractive power sequence alternating from negative to positive in the light direction. Commonly occurring optical aberrations, which usually have an opposing behavior, are thus avoided in the case of a suitable choice of the refractive power magnitudes. The refractive power magnitudes for well-corrected lens heads according to the invention, as listed in the tables, strike a balance between the optical aberrations while having maximum insensitivity to manufacturing tolerances at the same time. For the purposes of correcting the chromatic aberrations, the lens head contains at least two lens elements with an optical material with anomalous partial dispersion. An embodiment that can still be realized in cost-effective fashion has three lens elements with anomalous partial dispersion.

The task of lens elements with anomalous partial dispersion is that of correcting the wavelengths of the secondary spectrum (violet-blue wavelength range). The partial dispersion is a property of the glass material employed, which describes the ratio of the refractive index at short wavelengths, in the violet-blue wavelength range in this case, to the refractive index at long wavelengths, in the red wavelength range in this case. In the case of glass materials with anomalous partial dispersion, this ratio deviates from that of a normal glass material defined as a standard, such as for example the glass type denoted N-F2, a glass produced by Schott.

There is positive and negative anomalous partial dispersion. The SCD values, which are either positive or negative, specify the amount and hence the effect of the anomalous partial dispersion. In order to be able to use the anomalous partial dispersion of the glass for color correction, there is a need for a specific combination of refractive power, position of the lens element in the employed lens element sequence and sign of the anomalous partial dispersion of the respective lens element.

Advantageously, the focusing component, as a component part adoptable for both variants of a lens head described previously, has the same embodiment and therefor has at least two lens elements with a refractive power sequence alternating from negative to positive in the light direction. That is to say, the third lens element has negative refractive power again in an embodiment of a focusing component with three lens elements. As a cost-effective adoptable component part, the focusing component has the same refractive power for both lens head variants. Further costs are saved in the case of a focusing component that only consists of two lens elements.

The structure of the focusing component was chosen in such a way that the monochromatic and polychromatic optical aberrations remain minimal during the focusing movement. Usually, the refractive powers and radii of each lens element are defined at a specific position of this lens element in the optical system. That is to say, the position is chosen in such a way that, in the most expedient case, the lens elements have the maximum corrective effect on the optical aberrations. If a lens element is moved within the optical system, as is conventional during focusing procedures, said lens element usually also loses the maximum effect on the optical aberrations, together with its position. In the most inexpedient case, it could, at its new position in the optical system, even let the optical aberrations grow again. The monochromatic optical aberrations are counteracted in the focusing component according to the invention by way of the choice of the refractive powers and lens element radii. The polychromatic aberrations are advantageously counteracted by the chosen Abbe numbers and the refractive power sequence from negative to positive. As a result of the combination chosen according to the invention, the focusing component has hardly any influence on the polychromatic aberrations during the entire focusing movement. The Abbe numbers υe and the refractive powers of the lens elements specified in the tables in the claims state the strength of the chromatic dispersion of the respective lens element. The chromatic dispersion decreases with the increasing Abbe number. The chromatic dispersion increases with increasing refractive power. The refractive power of the lens, which is chosen according to the invention, is chosen on the basis of the length of the focusing travel and the imaging length of the optical system, while the Abbe number is used to correct the color. This realizes a corrected focusing component with maximum insensitivity in relation to manufacturing tolerances.

In the telephoto lenses described, the focusing component according to the invention is displaceably mounted along its focusing travel toward the image plane in the light direction when focusing from infinity to the close focus distance.

On the one hand, the optical system is less sensitive to its movement tolerances as the focusing travel increases; i.e., image aberrations on account of large justifiable tolerances do not increase in the case of a long focusing travel. This is desirable and advantageous in order, for example, to be able to realize a kit system with a mechanically couplable replacement interface at the point at which the aforementioned two optically transparent plane plates are inserted for mechanical separation purposes. On the other hand, a long focusing travel also requires a large installation space, which does not allow the realization of compact overall systems. However, the sensitivity of the system in respect of manufacturing tolerances and centration errors increases as a shorter focusing travel is chosen; in turn, this has more image aberrations as a consequence. Therefore, a refractive power weaker than −4.2 diopters for a justifiably long focusing travel with tolerance insensitivity for the focusing component on the one hand and a refractive power not stronger than −5.6 diopters for a desired compactness with justifiably tight manufacturing tolerances was found to be a good compromise. According to the invention, the focusing component therefore has a refractive power ranging between −4.2 and −5.6 diopters.

Then, the focusing travel is advantageously no more than 52.5 mm, with further mechanical restrictions being able to be taken into account in the case of a maximum focusing travel of 40 mm. A maximum focusing travel of 34.33 mm was found to be particularly advantageous in a particularly advantageous embodiment of the focusing component with a refractive power of −4.6 dpt.

In a telephoto lens according to the invention, the overall focal length of lens head and focusing component is between 490 mm and 500 mm in the case of a lens head with a 90 mm entrance pupil, the optimal focal length being 496 mm. In an embodiment with a lens head with a 105 mm entrance pupil, the overall focal length of lens head and focusing component lies between 570 mm and 590 mm, the optimal focal length being 579 mm.

In a particular configuration of a lens with a 90 mm entrance pupil, the focusable observable object distance to the first lens element vertex ranges from infinity to the minimum focusable close focus distance of 3250 mm. In the case of a lens with an entrance pupil of 105 mm, the object distance to the first lens element vertex ranges from infinity to the minimum focusable close focus distance of 4370 mm.

In a further advantageous development of the lenses according to the invention for a light ray at a wavelength $\lambda_e$, the optical path from the first lens element vertex to the image plane along the optical axis is 503 mm in the case of an entrance pupil of the lens being 90 mm, the optical path being 559 mm in the case of a lens with an entrance pupil of 105 mm.

Advantageously, in a telephoto lens according to the invention, a deflection prism for deflecting the imaging rays through 45° with respect to the optical axis and for an image erection through 180° is inserted into the imaging ray path between the focusing component and image plane. Advantageously, this renders an installation length shortening to the image plane realizable, the focusing travel of the focusing component reducing to no more than 34.33 mm.

For the purposes of advantageously sealing the optical overall system from environmental influences, an optically transparent plane plate is inserted into the imaging ray path of the focusing component downstream of the deflection prism and upstream to the image plane, in a manner parallel to said image plane. According to the invention a telescope (monocular observation device/spotting scope) with an oblique view is realized with the aid of an eyepiece, known per se, which renders the image in the image plane observable.

A further optimization of the optical imaging performance for a telephoto lens with a 90 mm entrance pupil is obtained by the optical parameters specified in the table listed below.

|    |    | Refractive power [dpt.] | Abbe number υe | Pg, F value | SCD value |
|----|----|----|----|----|----|
| OK | L1 | −1.18  | 44.02 | 0.5633 | −0.1006 |
|    | L2 |  5.89  | 81.20 | 0.5388 |  0.2496 |
|    | L3 | −3.89  | 49.36 | 0.5520 | −0.0884 |
|    | L4 |  2.46  | 81.20 | 0.5388 |  0.2496 |
| F  | L5 | −23.13 | 44.02 | 0.5633 | −0.1006 |
|    | L6 | 19.45  | 36.74 | 0.5862 | −0.0047 |
|    | U  |  0     | 56.37 | 0.5477 |  0.0102 |

The optical parameters specified in the table below are advantageous for a telephoto lens with an entrance pupil of 105 mm:

|    |    | Refractive power [dpt.] | Abbe number υe | Pg, F value | SCD value |
|----|----|----|----|----|----|
| OK | L1 | −1.01  | 44.02 | 0.5633 | −0.1006 |
|    | L2 |  5.04  | 81.20 | 0.5388 |  0.2496 |
|    | L3 | −3.32  | 49.36 | 0.5520 | −0.0884 |
|    | L4 |  2.10  | 81.20 | 0.5388 |  0.2496 |
| F  | L5 | −23.13 | 44.02 | 0.5633 | −0.1006 |
|    | L6 | 19.45  | 36.74 | 0.5862 | −0.0047 |
|    | U  |  0     | 56.37 | 0.5477 |  0.0102 |

An alternative representation of the optical parameters can be implemented on the basis of so-called ΔPg,F values. Here, the lens elements have the following numerical values: L1=−0.0065, L2=+0.0375, L3=−0.0092, L4=+0.0375, L5=−0.0065 and L6=+0.0046.

In an alternative telephoto lens, the focusing travel is no more than 20 mm, with the advantageous refractive power of the focusing component being −5.0 dpt. With an above-described lens with an entrance pupil of 90 mm and an advantageous restriction of the focusing travel to 18 mm, the focusable object distance to the first lens element vertex reaches from infinity to 7550 mm in the close focus distance. That is to say, the lens can be focused with sharp imaging on the image plane from a minimum distance of 7550 mm to infinity. In this case, the optical path from the first lens element vertex to the image plane on the optical axis is 553 mm for a light ray at a wavelength $\lambda_e$.

An above-described lens with an entrance pupil of 105 mm and with the same focusing component with a focusing travel of 18 mm and a refractive power of −5.0 dpt has a focusing range from infinity to the close focus distance of 10200 mm. Advantageously, the optical path for a light ray at the wavelength $\lambda_e$ is 609 mm from the first lens element vertex to the image plane in this embodiment.

In telephoto lenses according to the invention with 90 mm or 105 mm entrance pupils, two optically transparent plane plates which are perpendicular to the optical axis are introduced into the imaging ray path between the lens head and the focusing component for the mechanical separability of the two optical assemblies in an advantageous configuration. Furthermore, a straight-line view prism arrangement for image erection is inserted into the imaging ray path between focusing component and image plane. For protection against environmental influences, an optically transparent plane plate is inserted between the prism arrangement and upstream of the image plane, in a manner parallel to said image plane. For the purposes of observing the image in the image plane, use can be made of an eyepiece known per se, by means of which a telescope (monocular observation device/spotting scope) with a straight view is formed.

In an alternative telephoto lens with an entrance pupil of 90 mm, a further optimization of the optical imaging performance is achieved by the optical parameters specified in the table listed below:

|    |    | Refractive power [dpt.] | Abbe number υe | Pg, F value | SCD |
|----|----|----|----|----|----|
| OK | L1 | −1.18  | 44.02 | 0.5633 | −0.1006 |
|    | L2 |  5.89  | 81.20 | 0.5388 |  0.2496 |
|    | L3 | −3.89  | 49.36 | 0.5520 | −0.0884 |
|    | L4 |  2.46  | 81.20 | 0.5388 |  0.2496 |
| F  | L5 | −15.79 | 44.57 | 0.5656 | −0.0351 |
|    | L6 | 27.12  | 27.16 | 0.6096 |  0.0784 |
|    | L7 | −22.39 | 27.37 | 0.6036 |  0.0204 |
|    | L8 |  5.17  | 70.24 | 0.5305 |  0.0392 |
|    | U  |  0     | 56.37 | 0.5477 |  0.0102 |

An advantageous optimization, according to the invention, of the optical imaging performance in an alternative telephoto lens with an entrance pupil of 105 mm is obtained by the optical parameters specified in the table listed below.

|    |    | Refractive power [dpt.] | Abbe number υe | Pg, F value | SCD |
|----|----|----|----|----|----|
| OK | L1 | −1.01  | 44.02 | 0.5633 | −0.1006 |
|    | L2 |  5.04  | 81.20 | 0.5388 |  0.2496 |
|    | L3 | −3.32  | 49.36 | 0.5520 | −0.0884 |
|    | L4 |  2.10  | 81.20 | 0.5388 |  0.2496 |
| F  | L5 | −15.79 | 44.57 | 0.5656 | −0.0351 |
|    | L6 | 27.12  | 27.16 | 0.6096 |  0.0784 |
|    | L7 | −22.39 | 27.37 | 0.6036 |  0.0204 |
|    | L8 |  5.17  | 70.24 | 0.5305 |  0.0392 |
|    | U  |  0     | 56.37 | 0.5477 |  0.0102 |

The drawing illustrates exemplary embodiments of the telephoto lenses according to the invention in a manner true to scale; further construction data can be gathered from the tables specified above. It is evident to a person skilled in the art, an optical unit designer, that the structural outlay for telephoto lenses according to the invention reduces if a poorer optical imaging performance is accepted in return.

The exemplary embodiments are described in more detail below on the basis of the figures.

In the figures:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
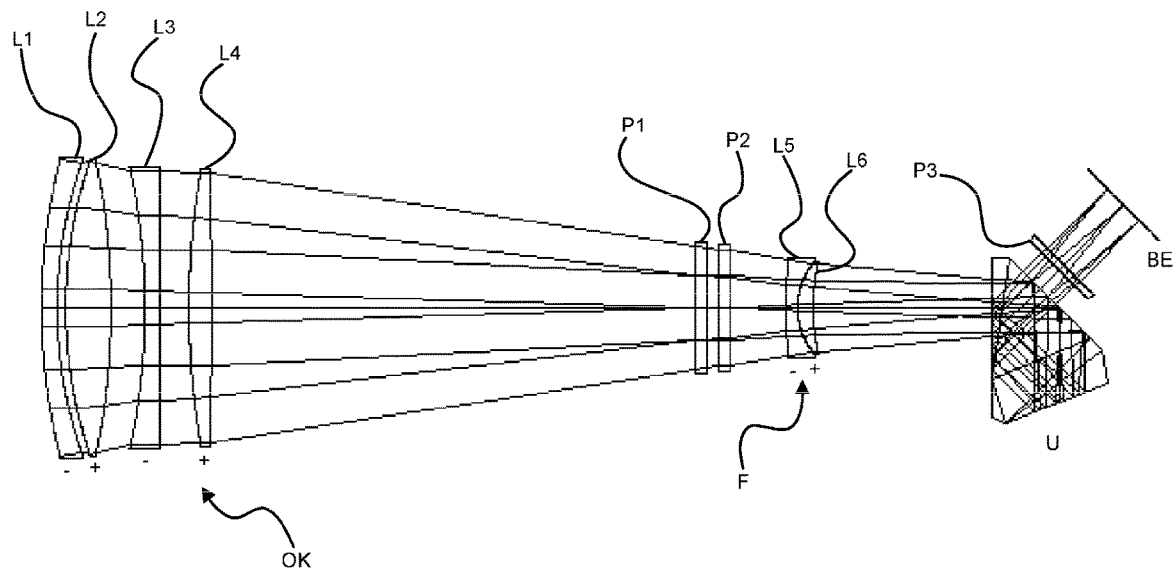
FIG. 1A shows a lens section through a telephoto lens arrangement with a 90 mm entrance pupil and a 45° deflection prism.

The lens according to FIG. 1a has an entrance pupil of 90 mm. In the lens head OK, the front lens element in the light direction is embodied as a negative convex-concave meniscus lens component L1 with a refractive power of −1.18 dpt. The form of the lens component facilitates a relatively large diameter, which is advantageous for a large aperture of the lens and hence for the capture of a wide open entrance ray. The second lens component L2 is embodied as a biconvex lens element with positive refractive power of 5.89 dpt and has, at a distance therefrom, a third lens component L3 with a negative refractive power of −3.89 dpt. In this lens component L3, the first face in the light direction has a concave curvature, with the light emergence face being configured as a plane face. This lens element can be manufactured cost-effectively on account of this configuration. A positive biconvex lens element is disposed in the lens head as a fourth lens component L4. An optically transparent plane plate P1, the diameter of which is larger than the diameter of the lens elements (L5, L6) of the focusing component F described below, is disposed at a great distance downstream of the lens component L4 with a refractive power of 2.46 dpt. Here, the distance between the plane plate P1 and the lens system (L1, L2, L3, L4), as measured from the last lens element vertex (L4), advantageously corresponds to no more than three times the installation length of the lens (L1, L2, L3, L4), as measured from the first to the last lens element vertex. The plane plate P1 serves as a dust-tight and water-tight termination of the lens head housing, not illustrated in any more detail, in which the four-lens-element lens head with optically transparent plane plate P1 is disposed.

An optically transparent plane plate P2 is disposed as a first component part in the focusing system embodied as a second optical assembly. The focusing component F is mounted to be displaceable along the optical axis for focusing purposes and embodied as a cemented component, consisting of a first focusing lens component L5 with negative refractive power and a second focusing lens component L6 with positive refractive power. Here, the lens component L5 is a convex-concave meniscus lens element with a refractive power of −23.13 dpt and the lens component L6 is a convex-concave lens element with a refractive power of 19.45 dpt. The overall refractive power of −4.6 dpt makes the focusing component F insensitive to mechanical tilt. By way of a suitable choice of the radii, glasses and mechanical distances, a third order spherical aberration SA3 of no more than 3 minutes was found to be advantageous for a telescope lens. At the same time, the contribution to the third order coma COMA3 should be chosen to be no greater than 15 minutes in terms of magnitude. The Petzval sum of the entire lens PETZ3 should be less than 0.5 minutes in terms of absolute value. Therefore, a third order spherical aberration SA3 of 1.02 minutes was found to be particularly advantageous for the focusing component F. In the case of a lens with a 90 mm entrance pupil, −0.22 minutes PETZ3 and 7.11 minutes COMA3 are particularly advantageous, while −0.48 minutes PETZ3 and 7.19 minutes for COMA3 were found to be particularly advantageous for a lens with a 105 mm entrance pupil. A deflection prism U for image erection through 180° and for deflection through 45° is disposed at a distance from the focusing component F, said deflection prism being followed by a third optically transparent plane plate P3. The optically transparent plane plates P2 and P3 seal the housing, which is not illustrated in any more detail and which receives the focusing component F and the deflection prism U, in air-tight and dust-type fashion in relation to environmental influences. The beam received by the lens head OK is subsequently imaged on the image plane BE in focus.

Figure 1B:
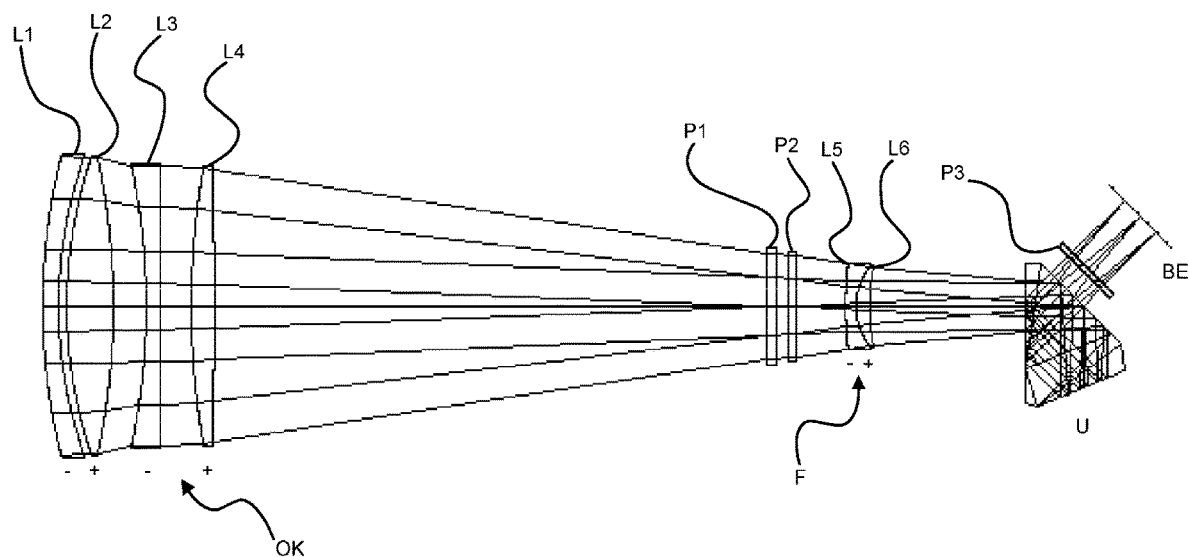
FIG. 1B shows a lens section through a telephoto lens arrangement with a 105 mm entrance pupil and a 45° deflection prism.

The entrance pupil is 105 mm in the lens according to FIG. 1b. In the lens head OK, the front lens element in the light direction is embodied as a negative convex-concave meniscus lens component L1 with a refractive power of −1.01 dpt. This form of the lens component facilitates a relatively large diameter and is advantageous for a large aperture of the lens and hence for the capture of a wide open entrance ray. The second lens component L2 is embodied as a biconvex lens element with positive refractive power of 5.04 dpt and has, at a distance therefrom, a third lens component L3 with a negative refractive power of −3.32 dpt. In this lens component L3, the first face in the light direction has a concave curvature, with the light emergence face being configured as a plane face. This lens element can be manufactured cost-effectively on account of this configuration. A positive biconvex lens element is disposed in the lens head as a fourth lens component L4. An optically transparent plane plate P1 is disposed at a great distance downstream of the lens component L4 with a refractive power of 2.10 dpt. Said plane plate serves as a dust-tight and water-tight termination of the lens head housing, not illustrated in any more detail, in which the four-lens-element lens head is disposed as a first optical assembly.

The focusing system, as a second optical assembly, has an identical embodiment to the one described in relation to FIG. 1a. It consists of an optically transparent plane plate P2, a focusing component F, which consists of a cemented component formed from lens elements L5 and L6, with a subsequently disposed deflection prism U and a further optically transparent plane plate P3 that terminates the focusing system. In this way, the focusing system is usable as an adoptable component part in a kit function. Subsequently, as described in relation to FIG. 1a, the ray received by the lens head OK is imaged in focus on the image plane BE.

Figure 2A:
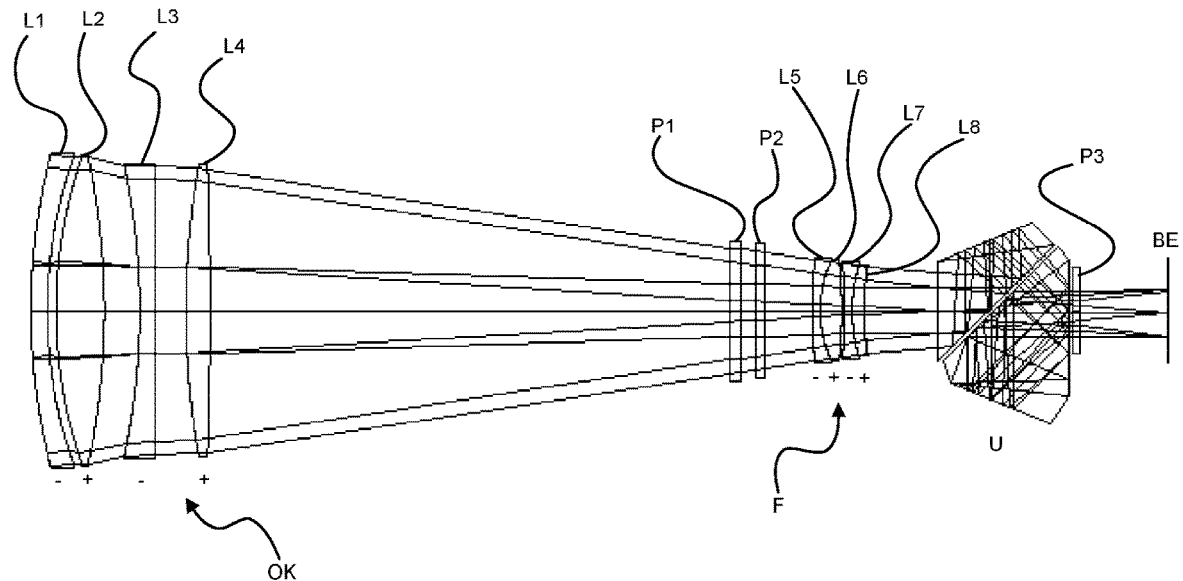
FIG. 2A shows a lens section through a telephoto lens arrangement with a 90 mm entrance pupil and a straight-line view deflection prism.

The lens according to FIG. 2a has the same lens head OK with an entrance pupil of 90 mm as the lens described in relation to FIG. 1a and it is therefore likewise advantageously suitable as an adoptable component part for a kit arrangement.

The focusing system, illustrated in FIG. 2a, as a second optical assembly for this lens head OK has an optically transparent plane plate P2 as a first component part and the focusing component F as a second component part. Here, the focusing component F is embodied as a lens element system consisting of two cemented components that are displaceable together along the optical axis. The first cemented component consists of a first lens component L5 with negative refractive power and a second lens component L6 with positive refractive power. Here, the lens component L5 is a convex-concave meniscus lens element with a refractive power of −15.79 dpt and the lens component L6 is a biconvex lens element with a refractive power of 27.12 dpt. The second cemented component consists of a first lens component L7 with negative refractive power and a second lens component L8 with positive refractive power. Like the lens component L5, the lens component L7 is a convex-concave meniscus lens element; however, it has a refractive power of −22.39 dpt and a smaller external diameter. The lens component L8 is a convex-concave lens element with a refractive power of 5.17 dpt. A straight-line view prism arrangement U for image erection through 180° is disposed at a distance from the focusing component F consisting of two cemented components with four lens components, said prism arrangement being closely followed by a third optically transparent plane plate P3. Here, the distance between the plane plate P3 and the prism arrangement U is advantageously smaller than the strength (thickness) of the plane plate P3. In this embodiment, too, the optically transparent plane plates P2 and P3 seal the housing, which is not illustrated in any more detail, of the focusing system comprising the focusing component F and the straight-line view prism U in air-tight and dust-type fashion in relation to environmental influences. Here, too, the ray received by the lens head OK is subsequently imaged on the image plane BE in focus.

Figure 2B:
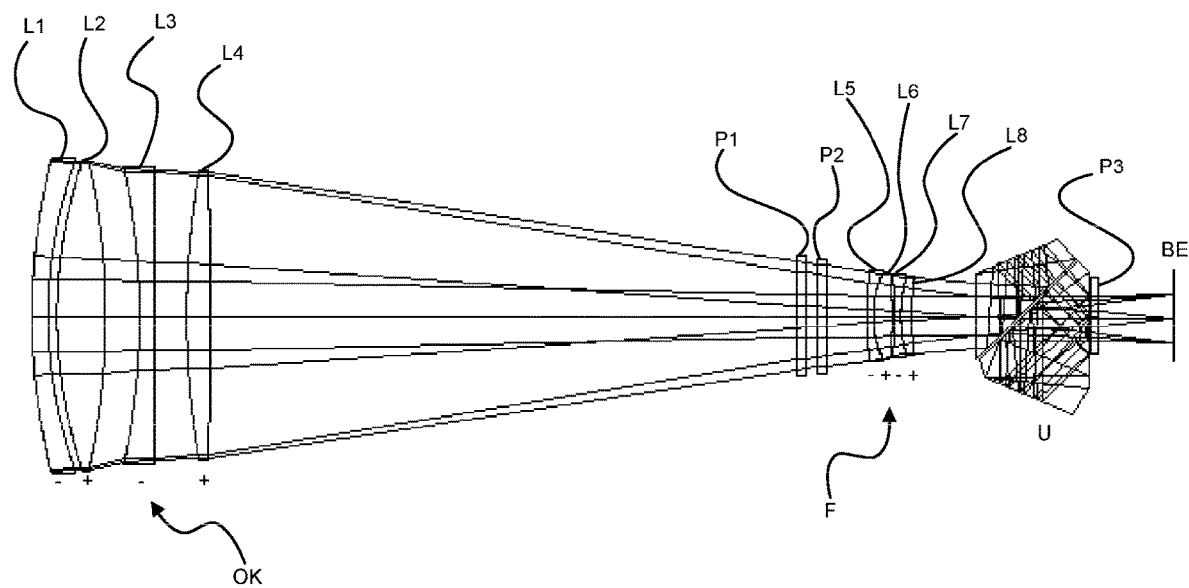
FIG. 2B shows a lens section through a telephoto lens arrangement with a 105 mm entrance pupil and a straight-line view deflection prism.

The lens according to FIG. 2b has the same lens head OK with an entrance pupil of 105 mm as the lens described in relation to FIG. 1b and it is therefore also advantageously suitable as an adoptable component part for a kit arrangement.

The focusing system, as a second optical assembly, has an identical embodiment to the one described in relation to FIG. 2a. It consists of an optically transparent plane plate P2, a focusing component F, which consists of two cemented components consisting of four lens elements L5, L6, L7 and L8. A straight-view deflection prism U and a further optically transparent plane plate P3 that terminates the focusing system are disposed thereafter. In this way, the focusing system is usable in a kit function as an adoptable component part from the lens system described in relation to FIG. 2a. The ray received by the lens head OK is subsequently imaged in focus on the image plane BE, as described in relation to FIG. 2a, and said ray can be observed there using an eyepiece not illustrated in any more detail.

Very long light paths of the marginal light rays arise on account of the very large 90 mm and 105 mm entrance pupils of the telephoto lenses. The Abbe number $\nu e$ determines the angular spread between the blue and the red wavelength of a light ray. In the case of long light paths through the overall optical arrangement to the image plane BE, already a small increase in the angular spread at this point in the optical ray path means that the blue and red light components of the ray have an increasingly pronounced distance from one another, leading to undesirable and perceptible chromatic aberrations. Therefore, the lens elements L1, L2 and L4 of both lens heads have high Abbe numbers $\nu e$.

The lens elements L2, L3 and L4 consist of glasses with anomalous partial dispersion. These lens elements control the violet wavelength range. In the tables, the anomalous partial dispersion is expressed numerically by Pg,F values and its effect is expressed numerically by means of SCD values. Here, the lens elements L2 and L4 have a strong positive partial dispersion. The lens element L3 has a strong negative partial dispersion. Together with the chosen refractive powers and SCD values, the lens element combination L2, L3 and L4 advantageously influences the violet wavelength range and thus compensates the above-described chromatic aberrations.

Alternative or additional aspherical lens faces can be used for a further correction, if necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A telephoto lens having an entrance pupil of between 80 and 110 mm, comprising:
    a lens head; and
    a focusing component, wherein
        the lens head, as a first optical assembly, consists of four lens elements with a refractive power sequence that alternates in the light direction and the focusing component is a second optical assembly made of at least two lens elements and has a aperture ratio of between 1:4.5 and 1:7, and
        two optically transparent plane plates which are perpendicular to the optical axis are introduced into the imaging ray path between the lens head and the focusing component for a mechanical separability of the optical assemblies.

2. The telephoto lens according to claim 1, wherein the entrance pupil is 90 mm in a lens head and its focal length is between 290 mm and 320 mm.

3. The telephoto lens according to claim 1, wherein the entrance pupil is 105 mm in an alternative lens head and its focal length is between 340 mm and 380 mm.

4. The telephoto lens according to claim 3, wherein the four lens elements of the respective lens head have a refractive power sequence alternating from negative to positive in the light direction, and wherein at least two lens elements consist of a glass with anomalous partial dispersion.

5. The telephoto lens according to claim 4, wherein the lens elements of the respective focusing component have a refractive power sequence alternating from negative to positive in the light direction and the focusing component in each case has the same refractive power.

6. The telephoto lens according to claim 5, wherein the focusing component is displaceable toward an image plane in the light direction when focusing from infinity to the close focus distance.

7. The telephoto lens according to claim 6, wherein the refractive power of the focusing component is between −4.2 diopter and −5.6 diopter.

8. The telephoto lens according to claim 7, wherein the focusing travel is no more than 52.5 mm.

9. The telephoto lens according to claim 8, wherein the overall focal length of the lens head and focusing component is between 490 mm and 500 mm in a case of a lens head with a 90 mm entrance pupil, and between 570 mm and 590 mm in a case of a lens head with a 105 mm entrance pupil.

10. The telephoto lens according to claim 9, wherein the object distance to the first lens element vertex ranges from infinity to 3250 mm in the close focus distance in the case of an entrance pupil of 90 mm, and ranges from infinity to 4370 mm in the close focus distance in the case of an entrance pupil of 105 mm.

11. The telephoto lens according to claim 10, wherein, for a light ray at a wavelength $\lambda e$, the optical path from the first lens element vertex to the image plane along the optical axis is 503 mm in the case of an entrance pupil of 90 mm and 559 mm in the case of an entrance pupil of 105 mm.

12. The telephoto lens according to claim 11, wherein a deflecting prism is inserted in the ray path between the focusing component and image plane for deflecting imaging rays by 45° with respect to the optical axis and for image reversal by 180°.

13. The telephoto lens according to claim 12, wherein an optically transparent plane plate is inserted into the imaging ray path of the focusing component downstream of the deflection prism and upstream to the image plane, in a manner parallel to said image plane.

14. The telephoto lens according to claim 13 having the optical parameters specified in the following tables, for telephoto lenses with entrance pupils of 90 mm and 105 mm:

Angled view into telephoto lens
EP 90

|   |    | Refractive power [dpt.] | Abbe number νe | Pg, F value | SCD value |
|---|----|------------------------:|---------------:|------------:|----------:|
| OK | L1 | −1.18 | 44.02 | 0.5633 | −0.1006 |
|   | L2 | 5.89  | 81.20 | 0.5388 | 0.2496 |
|   | L3 | −3.89 | 49.36 | 0.5520 | −0.0884 |
|   | L4 | 2.46  | 81.20 | 0.5388 | 0.2496 |
| F | L5 | −23.13 | 44.02 | 0.5633 | −0.1006 |
|   | L6 | 19.45 | 36.74 | 0.5862 | −0.0047 |
|   | U  | 0     | 56.37 | 0.5477 | 0.0102 |

Angled view into telephoto lens
EP 105

|   |    | Refractive power [dpt.] | Abbe number νe | Pg, F value | SCD value |
|---|----|------------------------:|---------------:|------------:|----------:|
| OK | L1 | −1.01 | 44.02 | 0.5633 | −0.1006 |
|   | L2 | 5.04  | 81.20 | 0.5388 | 0.2496 |
|   | L3 | −3.32 | 49.36 | 0.5520 | −0.0884 |
|   | L4 | 2.10  | 81.20 | 0.5388 | 0.2496 |
| F | L5 | −23.13 | 44.02 | 0.5633 | −0.1006 |
|   | L6 | 19.45 | 36.74 | 0.5862 | −0.0047 |
|   | U  | 0     | 56.37 | 0.5477 | 0.0102. |

15. The telephoto lens according to claim 7, wherein the focusing travel is no more than 20 mm.

16. The telephoto lens according to claim 15, wherein the object distance to the first lens element vertex ranges from infinity to 7550 mm in the close focus distance in the case of an entrance pupil of 90 mm and ranges from infinity to 10200 mm in the close focus distance in the case of an entrance pupil of 105 mm.

17. The telephoto lens according to claim 15, wherein, for a light ray at a wavelength λe, the optical path from the first lens element vertex to the image plane along the optical axis is 553 mm in the case of an entrance pupil of 90 mm and 609 mm in the case of an entrance pupil of 105 mm.

18. The telephoto lens according to claim 17, wherein a straight-line view prism arrangement for image erection is inserted into the imaging ray path between focusing component and image plane.

19. The telephoto lens according to claim 18, wherein an optically transparent plane plate is inserted into the imaging ray path of the focusing component downstream of the prism arrangement and upstream to the image plane, in a manner parallel to said image plane.

20. The telephoto lens according to claim 19 having the optical parameters specified in the following tables, for telephoto lenses with entrance pupils of 90 mm and 105 mm:

Straight view into telephoto lens
EP 90

|   |    | Refractive power [dpt.] | Abbe number νe | Pg, F value | SCD value |
|---|----|------------------------:|---------------:|------------:|----------:|
| OK | L1 | −1.18 | 44.02 | 0.5633 | −0.1006 |
|   | L2 | 5.89  | 81.20 | 0.5388 | 0.2496 |
|   | L3 | −3.89 | 49.36 | 0.5520 | −0.0884 |
|   | L4 | 2.46  | 81.20 | 0.5388 | 0.2496 |
| F | L5 | −15.79 | 44.57 | 0.5656 | −0.0351 |
|   | L6 | 27.12 | 27.16 | 0.6096 | 0.0784 |
|   | L7 | −22.39 | 27.37 | 0.6036 | 0.0204 |
|   | L8 | 5.17  | 70.24 | 0.5305 | 0.0392 |
|   | U  | 0     | 56.37 | 0.5477 | 0.0102 |

Straight view into telephoto lens
EP 105

|   |    | Refractive power [dpt.] | Abbe number νe | Pg, F value | SCD value |
|---|----|------------------------:|---------------:|------------:|----------:|
| OK | L1 | −1.01 | 44.02 | 0.5633 | −0.1006 |
|   | L2 | 5.04  | 81.20 | 0.5388 | 0.2496 |
|   | L3 | −3.32 | 49.36 | 0.5520 | −0.0884 |
|   | L4 | 2.10  | 81.20 | 0.5388 | 0.2496 |
| F | L5 | −15.79 | 44.57 | 0.5656 | −0.0351 |
|   | L6 | 27.12 | 27.16 | 0.6096 | 0.0784 |
|   | L7 | −22.39 | 27.37 | 0.6036 | 0.0204 |
|   | L8 | 5.17  | 70.24 | 0.5305 | 0.0392 |
|   | U  | 0     | 56.37 | 0.5477 | 0.0102. |

\* \* \* \* \*